United States Patent [19]

Greenspun

[11] Patent Number: 5,172,363
[45] Date of Patent: Dec. 15, 1992

[54] METHOD AND APPARATUS FOR AUTOMATIC RECORDING OF MARKER DURING INFORMATION RECORDING

[76] Inventor: Philip Greenspun, 55 Russell St., Melrose, Mass. 02176

[21] Appl. No.: 852,838

[22] Filed: Mar. 16, 1992

Related U.S. Application Data

[63] Continuation of Ser. No. 337,258, Apr. 13, 1989, abandoned.

[51] Int. Cl.$^5$ .......................... G11B 3/64; G11B 27/02
[52] U.S. Cl. ........................................ 369/85; 369/84; 360/13; 360/72.1; 360/72.2
[58] Field of Search .............................. 369/3, 84, 85; 360/72.1, 72.2, 74.4, 27, 13

[56] References Cited

U.S. PATENT DOCUMENTS

| | | |
|---|---|---|
| 3,921,209 | 11/1975 | Yoshino et al. . |
| 3,997,721 | 9/1976 | Umemoto et al. . |
| 4,224,642 | 9/1980 | Mawatari et al. . |
| 4,238,852 | 12/1980 | Iga et al. . |
| 4,246,615 | 1/1981 | Shiraishi et al. . |
| 4,274,115 | 6/1981 | Wada et al. . |
| 4,281,355 | 7/1981 | Wada et al. . |
| 4,309,726 | 1/1982 | Tanaka et al. . |
| 4,330,860 | 5/1982 | Wada et al. . |
| 4,356,566 | 10/1982 | Wada et al. . |
| 4,403,263 | 9/1983 | Kageyama et al. . |
| 4,451,919 | 5/1984 | Wada et al. . |
| 4,466,029 | 8/1984 | Tanaka ................ 360/72.2 |
| 4,467,370 | 8/1984 | Hoshino et al. . |
| 4,507,687 | 3/1985 | Hirota et al. . |
| 4,528,588 | 7/1985 | Löfberg ................ 369/84 |
| 4,530,048 | 7/1985 | Proper . |
| 4,571,457 | 2/1986 | Hattori et al. ........... 379/77 X |
| 4,583,208 | 4/1986 | Verbsom ............... 360/72.1 |
| 4,602,297 | 7/1986 | Reese . |
| 4,641,203 | 2/1987 | Miller ................... 369/14 X |
| 4,707,749 | 11/1987 | Nishijima et al. ......... 360/72.2 |
| 4,723,181 | 2/1988 | Hickok ................. 369/15 X |
| 4,802,018 | 6/1989 | Takinawa et al. .......... 360/13 |
| 4,802,114 | 1/1989 | Sogame .............. 340/825.72 X |
| 4,812,924 | 3/1989 | Fukami et al. ............ 360/32 |
| 4,823,333 | 4/1989 | Satoh et al. .............. 369/84 |
| 4,841,503 | 6/1989 | Yamada et al. ............ 369/14 |
| 5,023,730 | 6/1991 | Sakata et al. ............. 360/48 |
| 5,068,752 | 11/1991 | Tanaka et al. ............ 360/32 |

OTHER PUBLICATIONS

Watkinson, John (1988) "The Art of Digital Audio", chapter 13, pp. 440, 486; Section 13.10 CD Subcode; Section 13.8 Channel Code.

*Primary Examiner*—John W. Shepperd
*Assistant Examiner*—Tan Nguyen
*Attorney, Agent, or Firm*—Lahive & Cockfield

[57] ABSTRACT

In one embodiment of the invention, multiple selections recorded on CD's are re-recorded on a video medium or on a digital audio medium together with the recording of markers. The markers are recorded automatically, typically in response to CD track changes and disc changes, to locate the re-recorded selections, during playback. The method and apparatus of the invention can employ PCM recording and can be practiced with consumer electronic equipment.

24 Claims, 3 Drawing Sheets

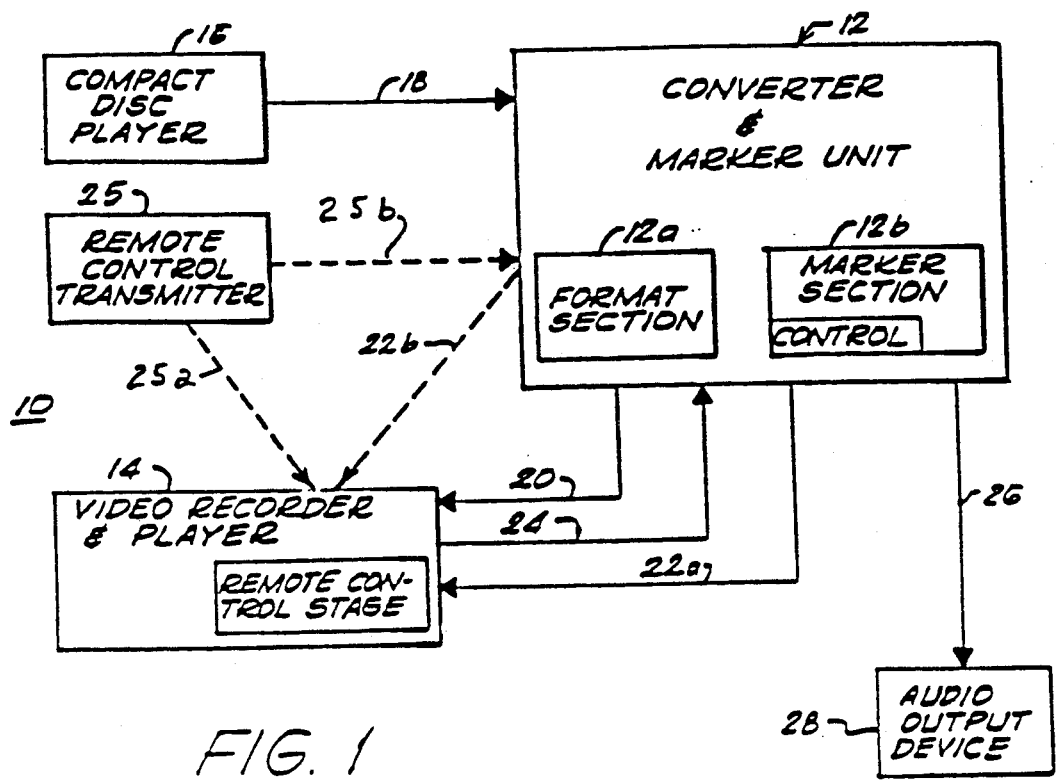
FIG. 1
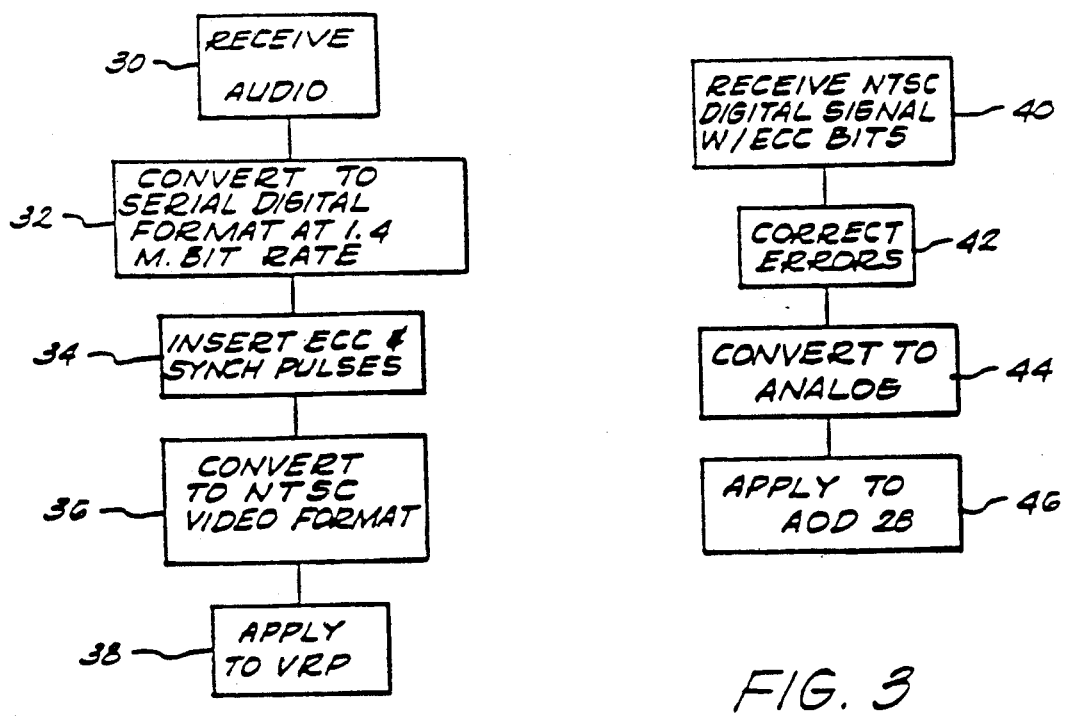
FIG. 2
FIG. 3

METHOD AND APPARATUS FOR AUTOMATIC RECORDING OF MARKER DURING INFORMATION RECORDING

This application is a continuation of application Ser. No. 337,258, filed Apr. 13, 1989, now abandoned.

BACKGROUND

This invention relates to a method and apparatus for the automatic recording of marker information, particularly with consumer electronic equipment, during the recording of audio or other information that is read from storage on a source medium. The marker information locates the re-recorded information according to its previous placement or location on the source medium.

The invention is described principally with reference to embodiments for quickly locating each of numerous audio selections that are re-recorded on video tape or on digital audio tape (DAT), from prior recording as audio information in digital form, on a compact disc (CD) or other source medium. Features of the invention are, however, useful with other information and in other contexts.

With reference to one typical embodiment, the owner of numerous audio recordings, e.g. on compact discs, may desire to re-record numerous selections on videotape. The resultant videotape can provide a multiple-hour playback capability, in place of the far shorter playback time from a commercial compact disc. The re-recorded video tape hence spares the owner from the requirement of changing discs.

The re-recording on a video medium of information stored on a non-video medium is known. The following U.S. patents describe various aspects of equipment for such operation.

| | |
|---|---|
| 3,921,209 | Yoshino et al. |
| 3,979,721 | Umemoto et al. |
| 4,224,642 | Mawatari et al. |
| 4,238,852 | Iga et al. |
| 4,246,615 | Shiraishi et al. |
| 4,274,115 | Wada et al. |
| 4,281,355 | Wada et al. |
| 4,309,726 | Tanaka et al. |
| 4,330,860 | Wada et al. |
| 4,356,566 | Wada et al. |
| 4,403,263 | Kageyama et al. |
| 4,451,919 | Wada et al. |
| 4,467,370 | Hoshino et al. |
| 4,507,687 | Hirota et al. |
| 4,530,048 | Proper |

The re-recording of information as set forth herein presents problems which are not solved by the known practices that these patents illustrate.

An object of this invention is to provide a method and apparatus for storing plural selections read from a source medium, together with the storage of marker information for locating the selections for selective play-back.

A further object is to attain such storage of marker information automatically, and, further with existing consumer recording equipment. One example of such existing equipment is a video cassette recorder, and another is a digital audio tape recorder.

Another object of the invention is to provide a method and apparatus of the above character that can employ any of a number of input conditions and signals to produce a selection-designating marker. Yet another object is to provide such a method and apparatus in which the designated marker includes selection identifying information.

Other objects of the invention will in part be obvious and will in part appear hereinafter.

SUMMARY OF THE INVENTION

The re-recording of non-video source information in accordance with the invention includes reading from a source medium the information that is to be stored, converting it as necessary to the re-recording format, and storing the resultant information together with the storage of a marker that designates the location of the re-recorded information.

In a typical embodiment, the information is a selection of audio information, and the marker designates the location of that selection as re-recorded on the new medium. The designation of location can be simply a marker; or it can be an identification of the selection, an identification of the location of the selection as re-recorded, or an identification of the previous location of the selection on the source medium.

The features of the invention include recording such a marker automatically with the re-recording of each of numerous selections. Another feature is to employ remote control capabilities of existing consumer electronic equipment, where available, for the recording of such markers. Yet another feature is to provide an updated marker in response to any of numerous conditions.

One illustrative practice of the invention provides re-recording equipment for connection with a device for reading source information, for example with a compact disc (CD) player, and for connection with a video recorder, such as a conventional video cassette recorder (VCR). The re-recording equipment converts the digital audio information read from the CD player to a video format for re-recording with the VCR. It also produces a signal that actuates the VCR to record a marker on the mark track of the video tape.

A preferred practice is for the re-recording equipment to transmit the marker recording signal to the VCR in the form of a transmitted infrared signal coded to actuate the remote control circuitry of the VCR. Each marker is recorded in association with a re-recorded selection of information to designate or identify that selection. The marker thus facilitates locating the re-recorded selection.

In one instance, the re-recording equipment produces the marker signal each time the CD player commences reading from a different track and each time it commences reading from a different disc.

A further specific feature is for the re-recording equipment to produce the marker signal in response to a change in track identification and in response to a change in disc identification, as recorded in the subcode on the compact disc which contains the source information that is being read and re-recorded. Another instance is for the re-recording equipment to monitor the audio information it receives from the CD player, or other apparatus producing the source information, to detect interruptions or other changes that correspond to a track changes and to disc changes A specific feature is to detect each such change and to distinguish disc changes from track changes. Yet another specific implementation is for the re-recording equipment to monitor the power consumption of the CD player, or other producer of source information, to detect operations corresponding to a disc change. Thus, according to this feature of the invention, the re-recording equipment monitors signals from the source of the information to be re-recorded to detect a change in the placement or location, on the storage medium, of the source information that is being read for re-recording.

The foregoing and other features of the invention can be attained in other practices, for example, where the re-recording equipment is combined with either the CD player or other source device, and/or with the VCR or other recording device.

One feature of a practice of the invention in the re-recording of non-video information, where the re-recording is in a set of one or more data tracks of a medium also having at least one mark track and where the non-video source information is read from storage in a designated source location, is to record a search marker in the mark track concurrently with the re-recording of the source information in the set of data tracks. The recording of the search marker can be responsive to the reading of the source information. Alternatively it can be responsive to the reading of source location designation.

The practice of the invention has multiple advantages, including enabling the owner of consumer electronic equipment to record numerous selections of non-video information serially on a video medium, typically video tape, and with the automatic concurrent recording of markers designating different re-recorded selections. The markers are typically are each unique for different source selections and typically include numerical information identifying that selection and/or the source recording from which it came. The markers enable any given selection or set of selections of the re-recorded information to be located and identified readily. Similar advantages are realized in practice of the invention on other media, notably including digital audio tape, instead of video tape.

The invention accordingly comprises the several steps and the relation of one or more of such steps with respect to each of the others, and the apparatus embodying features of construction, combinations of elements and arrangements of parts adapted to affect such steps, all as further exemplified in the following detailed disclosure, and the scope of the invention is indicated in the claims.

BRIEF DESCRIPTION OF DRAWINGS

For a fuller understanding of the nature and objects of the invention, reference is to be made to the following detailed description and the accompanying drawings, in which:

FIG. 1 is a block schematic representation of re-recording apparatus according to the invention;

FIGS. 2 and 3 illustrate re-recording and playback operations of the apparatus of FIG. 1;

DESCRIPTION OF ILLUSTRATIVE EMBODIMENTS

Figure 4:
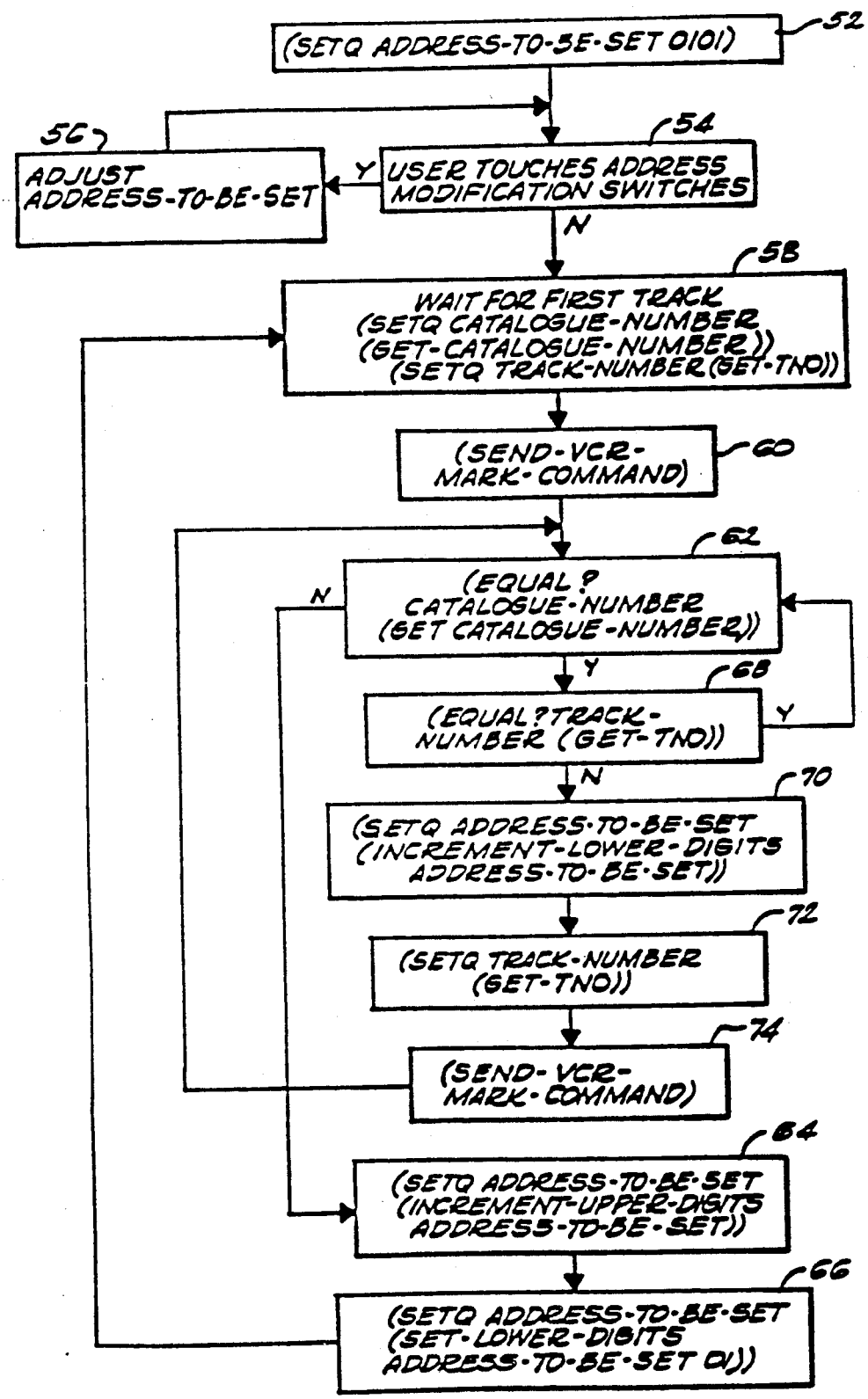
FIG. 4 shows a flow chart of operation for the system of FIG. 1 in accordance with one practice of the invention.

FIG. 1 shows a system 10 according to the invention that has a converter and marker unit (CMU) 12 for re-recording on video tape, by way of a video recorder and player 14, audio selections stored on compact discs (CD) and read by a compact disc player 16.

The compact disc player applies a conventional stream of digital signals to the converter and marker unit 12, by way of signal path 18, when the player 16 is reading a selection of audio information recorded on a compact disc. The converter and marker unit 12 converts the format of the CD digital information to a standard video format by way of a format section 12a. The resultant video-formatted digital information is applied from the unit 12 to the video recorder and player (VRP) 14 by way of a signal path 20. The recorder and player 14, in response records the audio information in standard video format on a video medium, typically a video tape cassette.

A marker section 12b in the converter and marker unit 12 responds to signals produced during the read operation of the player 16 to produce a marker signal which it can send to the video recorder and player 14 by way of a cabled signal path 22a and/or by a wireless signal path 22b. Each such command signal actuates the recorder and player to record a marker designation in a control or mark track provided on the video medium, e.g. the video tape, on which the recorder and player is recording the video-formatted audio information.

The marker signal, which the CMU 12 produces for recording a marker designation by the video recorder and player 14 concurrently with the video recording of audio information, is responsive to the placement of the audio information on the source recording, e.g., the compact disc. Further, the marker signal is timed for recording on the video medium in selected association with the re-recording of a corresponding audio selection on the video medium. The marker signal, in a preferred embodiment, contains information for addressing and thereby identifying and/or locating the audio selection with which it corresponds, and which is being re-recorded on the video medium essentially concurrently with the recording of the marker signal.

The marker section 12b preferably produces a new marker signal, for recording by the video recorder and player 14, in response to each change in location on a compact disc from which the player 16 reads audio information that is being re-recorded. Each new marker signal preferably contains a different address, for uniquely identifying the audio selection with which it corresponds. In one preferred instance, the converter and marker unit 12 produces a new marker signal in response to each change in recording track being read on the disc player 16 and also in response to each change of disc being read on the player 16.

With further reference to FIG. 1, during playback operation of video tape recorded with the system 10, the format section 12a of the CMU 12 receives video-formatted audio information which the video recorder and player reads from the re-recorded tape, by way of a signal path 24. The CMU 12 converts this playback signal to a desired audio format. In one illustrative practice, it converts the playback signal to digital audio format and further to analog audio format. The resultant audio signal is applied, by way of a signal path 26, to an audio output device 28. The audio output device 28 typically includes conventional audio reproducing equipment, such as an audio amplifier.

FIG. 2 shows one specific operating sequence of the converter and marker unit 12 of FIG. 1 for re-recording a selection of audio information on the video recorder and player 14, and FIG. 3 shows the further sequence for playing back the selection by way of the audio output device 28.

As shown in FIG. 2, for re-recording an audio selection, the converter and marker unit 14 receives audio signals, as indicated with operation 30 and suitably by way of the signal path 18 from the compact disc player 16. The converter and marker unit 12 converts the input audio signal to a serial digital format, typically having a 1.4 megabit per second serial rate, as designated with operation 32. The illustrated unit 12 adds an error correcting code (ECC) and synchronizing pulses to the serial digital signal as indicated with operation 34. The unit 12 then converts the resultant serial digital signal to the known NTSC video format, as indicated with operation 36. In the last step in the illustrated record sequence, indicated with operation 38, the unit 12 applies the video-formatted signal to the video recorder and player 14 for re-recording the original audio selection, in video format, on a video tape.

During the playback operation, as indicated with FIG. 3, the converter and marker unit 12 receives from the video recorder and player 14 an NTSC video format digital signal, by way of signal path 22, as indicated with operation 40. The illustrated unit 12 processes ECC bits to correct errors, as indicated with operation 42, and converts the corrected digital serial sequence to an analog format as indicated with operation 44. The resultant analog audio signal is applied by way of the signal path 26 to the audio output device 28, operation 46.

With further reference to FIG. 1, in addition to the operations of FIG. 2 for re-recording selections of audio information, the converter and marker unit 12 automatically records marker designations in the control track of the video tape or other video medium.

In one specific embodiment as illustrated in FIG. 1, the unit 12 receives on the signal path 18, from the compact disc player 16, both audio signals identifying the selection of information to be re-recorded and subcode information which the player 16 reads from the compact disc. A standard format for data blocks recorded on a compact disc includes subcode information. The subcode information typically locates the beginning of each selection on a compact disc and identifies the location of each selection on the disc. The text entitled "The Art of Digital Audio" by John Watkinson, published by Focal Press, Copyright 1988, discusses compact discs in chapter 13 and discusses CD subcode in section 13.10.

The marker section 12b of the illustrated converter and marker unit 12 has a digital logic processor that monitors the subcode information received from the CD player 16 and produces marker signals in response to the subcode information. In one preferred practice, the marker section 12b produces a new marker signal for each change of compact disc track as identified by the subcode information, and preferably also for each change of compact disc, as also identified by subcode information.

The converter and marker section 12b sends the marker signal to the video recorder and player 14 by way of a signal path that can be either a conductive or other cabled path 22a or a wireless path 22b. In a preferred remote control embodiment, the unit 12 sends the marker signal via the wireless path as an infrared signal that activates the remote control receiver of the recorder and player 14. The converter and marker unit 12 thus formats the marker signal identically as a conventional infrared signal from the remote control transmitter 25 with which a user remotely controls conventional operations of the recorder and player, by way of remote control path 25a. The video recorder and player 14 responds by recording a marker designation in the mark track of the video tape medium, concurrently with the re-recording of a selection of audio information in the set of data tracks of that recording medium.

The CMU 12 can be pre-set to produce marker signals with a prescribed format, to match the format of a designated remote control transmitter. It is preferred, however, that the unit 12, and particularly the marker section 12b, be programmable to produce marker signals with any of a variety of formats, to match a particular transmitter 25. For this operation, the marker section 12b includes circuits that in a learn mode of operation, respond to remote control signals from the transmitter 25, as indicated with remote signal path 25b, and that store format information of the transmitter signals. In a subsequent record mode of operation, the marker section 12b produces marker signals with the desired format to match that of the transmitter 25.

The remote-control transmission of the marker signal by the converter and marker unit, is advantageous in that it facilitates consumer interconnection of the unit 12 with a conventional video recorder. In other embodiments, the converter and marker unit 12 can send the marker signal to the recorder and player 14 with other remote transmission, including ultrasonic, optical, and radio frequency, or with a hard-wired electrical or optical signal path. Those skilled in the art can implement these embodiments with known skills and components.

Alternative to producing a marker signal in response to the compact disc subcode, as discussed, above, the marker section of the converter and marker unit 12 can monitor other manifestations of the operation or output information of the compact disc player 16 to determine when to produce a new or at least another marker signal, and thereby to activate the video recorder and player 14 to record a marker designation. One such manifestation, other than CD subcode, is for the digital logic processor of the marker section 12b to monitor the audio responsive information being read by the disc player 16 and applied to the format section 12a, and to detect signal conditions corresponding to intervals of selected silences or other selected signal conditions as the demarkation between different selections of information.

In a further embodiment, the converter and marker unit 12 monitors the power consumption of the compact disc player 16 to detect that the player is executing a disc-change operation.

The converter and marker unit 12 is thus connected with the compact disc player 16, illustratively by way of the signal path 18, for receiving both the audio-responsive information that is to be re-recorded in video format and further information identifying or designating the location, or a change in the location, from which that information is read from the compact disc or other source recording. The manifestations of information location and parameters to be monitored thus include subcode and other control information recorded with the selections of audio information, changes in the stream of audio information indicative of a change in selection or change in recording location, e.g. track and disc, and change in power consumption indicative of a disc change.

FIG. 4 shows a flow chart, in both pseudo-Lisp code and in ordinary text, for an illustrative sequence of operations of the marker section 12b of the converter and marker unit 12 for producing new marker signals to identify successive locations of selections of information re-recorded with the video recorder and player 14.

The first operations in the flow chart initialize the marker address that will be recorded. An operation 52 stores an initial catalog number and track number illustrated as 0101 in the variable named "address-to-be-set". Where the converter and marker 12 has switches with which a user can select a different initializing address, the next illustrated operation 54 determines whether the user is touching those switches. An affirmative decision advances the sequence to operation 56, in which the address-to-be-set variable is changed to store the initializing address which the user switches designate. A negative determination from operation 54 advances the sequence to operation 58.

In this operation the illustrated sequence is quiescent and essentially waiting for identification, e.g., from the CD subcode, that the compact disc player 16 of FIG. 1 is reading the first track. In response to that subcode information from the player 16, the marker section 12b of the unit 12 stores the catalog number of the compact disc being played, as obtained by calling the function get-catalog-number, and stores the result as the catalog-number variable. The track number of the compact disc being played is then obtained by calling the function get-TNO, and the resultant number is stored as the track-number variable.

At this juncture, the illustrated sequence sends the first address-bearing marker signal to the video recorder and player 14 by calling the function send-VCR-mark-command, as designated with the operation 60. In one embodiment described above, this command causes the converter and marker unit 12 to transmit a remote-control, e.g., infrared, signal to the video recorder and player 14. If the recorder and player is of the index search type, the transmitted marker signal causes a designated index mark to be recorded. Where the recorder and player 14 is of the address search type, the marker signal which the converter and marker unit 12 sends has a preamble followed by the digits of the variable address to be set. The marker signal can be followed with a postamble, depending on the equipment being used. The effect of this remote-control signal sequence is to actuate the video recorder and player to record an address mark in the mark track, with an address as specified by the address-to-be-set variable.

The illustrated operating sequence of FIG. 4 advances to further operations that determine when to change the address to be set variable. In the illustrated operation 62, the unit 12 compares the stored catalog number variable with the value returned by the get-catalog-number function, which identifies the catalog number of the disc currently being played, i.e., read, on the player 16. When the two values differ, the sequence advances to operation 64, in which the disc number portion of the address-to-be-set variable is incremented and stored. A subsequent operation 66 resets the track number part of the address-to-be-set to the initializing value 01, and the sequence returns to perform again operation 58.

Where the comparison of operation 62 produces an affirmative result, the next operation 68 compares the stored track number with the track number which the compact disc player 16 is currently reading. An affirmative output returns the sequence to operation 62, whereas a negative determination increments the track number portion of the address-to-be-set and stores that value, in operation 70.

The illustrated sequence advances to fetch and store, as the variable track-number the number of the track currently being played on the player 16, after which a new address containing marker signal is sent to the video recorder and player 14, as designated with operation 74. The illustrated operation then returns to repeat the first test of equality designated with operation 62.

Further to the showing in the flow chart of FIG. 4, a preferred practice is to perform operations 54 and 56, which involve the user switches, essentially continuously, on a multi-processing basis. The illustrated sequence essentially instantly enters a change in the address-to-be-set, which the switches specify, typically by using timer-generated interrupts to the illustrated sequence.

Further specific comments regarding the FIG. 4 flow chart follow. The Lisp syntax is function calls surrounded by parentheses with variables specified by name.

(setq variable-name form-to get-value,) as in operations 52 and 70, evaluates form-to-get-value and stores the result in the variable named by variable-name.

(equal? form1 form2), as in operations 62 and 68, compares the values of form1 and form2 and returns "yes" if they are equal, "no" if they are not.

(get-catalog-number), as in operation 58, is a form that specifies the value returned by the function get-catalog-number. This function waits for a Q subcode word of mode 2, containing the catalog number, and returns the number (thirteen decimal digits stored in the 11th through 62nd bits of the 96-bit Q word).

(get-TNO), as in operation 68, is a form that specifies the value returned by the function get-TNO. This function waits for a Q subcode word of mode 1, containing the track number of the track currently being played, and returns that number (two hexadecimal digits, stored in bits 11 through 18 of the 96-bit word).

(send-VCR-mark-command), as in operations 60 and 72, causes infrared light to be transmitted to the VCR. If the VCR is of the index search type, a simple sequence is sent to cause an index mark to be made. If the VCR is of the Address Search type, a preamble is sent, then infrared light specifying the four digits of the variable address-to-be-set, then a postamble. The preamble and, separately, the postamble, can be omitted, depending on the particular implementation. The effect of this infrared sequence is to cause an address mark to be made by the VCR, with the same address as in the variable address-to-be-set.

The operation 64 to (increment-upper-digits four-digit number) is a form that specifies the value returned by the function increment-upper-digits when applied to the argument four-digit-number. Increment-upper-digits returns a number with the same lower two digits as its argument, but with the upper two digits incremented by 1, modulo 100. For example:
(increment-upper-digits 2345)→2445
(increment-upper-digits 0000)→0100
(increment-upper-digits 9945)→0045
(increment-upper-digits 9900)→0000

Increment-lower-digits, as in operation 70, is an analogous function that returns a number with the same upper two digits and the lower two digits incremented by 1, modulo 100.

(increment-lower-digits 2345)→2346
(increment-lower-digits 0000)→0001
(increment-lower-digits 4599)→4500
(increment-lower-digits 0099)→0000

(set-lower-digits number new-digits) as in operation 66, returns a number whose lower two digits are the same as the lower two digits of new-digits and whose upper digits are the same as number.
(set-lower-digits 0513 01)→0501
(set-lower-digits 0000 99)→0099
(set-lower-digits 1111 00)→1100

Figure 5:
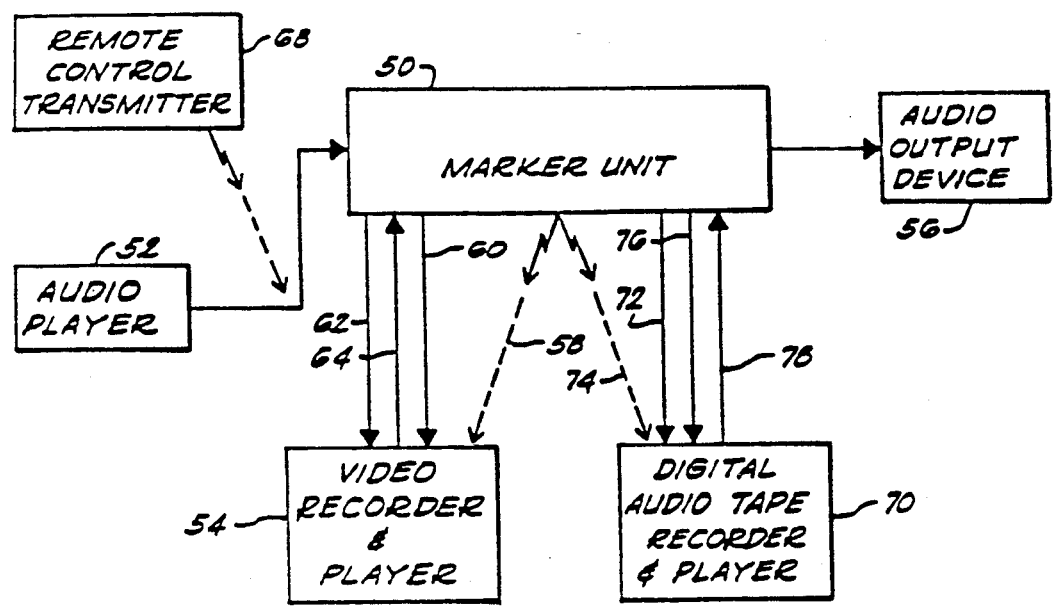
FIG. 5 shows another embodiment of re-recording apparatus according to the invention.

FIG. 5 shows a marker unit 50 according to the invention that re-records selections of audio information, which an audio player 52 reads from a source recording, on either or both a video medium and a digital audio tape medium. The illustrated marker unit 50 connects with a video recorder and player 54, with the audio player 52, and with an audio output device 56, in the same manner as the FIG. 1 unit 12 connects with the elements 14, 16 and 28, respectively. The former connections are illustrated as including both wireless and cabled signal paths 58 and 60, respectively, for sending a marker signal. The video recorder and player 54 is of the type that responds to remote control operator commands transmitted by a remote control transmitter 68. Other connections illustrated include a cable 62 for applying video signals to the recorder and player 54 for re-recording, and a cable 64 for video playback signals read from the video medium for playback.

FIG. 5 further shows that a digital audio tape recorder and player 70, illustrated with a remote control capability, connects with the marker unit 50 by way of a cable 72 to re-record audio selections read from a source recording by way of audio player 52. The digital recorder 70 records markers in a mark track of the digital audio tape medium in response to marker signals it receives, either by way of a wireless path 74 or a cable 76. The operation of the digital recorder and player 70 for re-recording audio selections with markers can be essentially identical to the corresponding operation of the video recorder and player 14 as described above with reference to FIG. 1, except with a digital audio tape format as customarily used in commercial DAT equipment. The digital recorder and player 70 is further illustrated as connected with the converter and marker unit 50, by way of signal path 78, for delivering digital audio signals read from the recorder and player 70, suitably for playback by way of the audio output device 58.

Alternative to routing audio signals to and from the digital recorder and player 70 by way of the marker unit 50, as FIG. 5 illustrates with signal paths 72 and 78, audio selections read from the audio player 52 can be applied directly to the digital recorder and player 70 via a direct signal path (not shown) between the devices 52 and 70. Similarly, a direct signal path (not shown) can be provided between the digital recorder and player 70 and the audio output device 56 to apply the digital audio selections read from the digital audio tape directly to the audio output device 56.

A further alternative to the specific arrangement shown in FIG. 5 is to apply digital audio signals read from a source medium directly from the audio player 52 to the digital input of the digital recorder and player 70. The recorder and player 70 in this alternative embodiment re-records the audio selections it receives directly from the audio player concurrently with recording markers in response to marker signals received from the marker unit 50. In either instance, the marker unit 50 produces the marker signals 50 according to the techniques described above with reference to FIGS. 1 and 4.

The provision of a converter and marker unit 12, as shown in FIG. 1, enables the invention to be practical with a separate CD player 16 and a separate video recorder and player 14, each of which can be commercially available consumer electronic products. The audio output device 28 likewise can be a standard product. Similarly, the marker unit 50 of FIG. 5 can operate with elements 52, 54, 56 and 70 that are available consumer electronic products. The invention can equally be practiced by combining the converter and marker unit 12 of FIG. 1, and the marker unit 50 of FIG. 5, with any of the elements illustrated as connected with it. As one illustrative example, the converter and marker unit 12 can be combined with the video recorder and player 14 into a single product.

It is further contemplated that a converter and marker according to the invention as illustrated in FIG. 1 can also receive, from the video recorder and player, marker and other signals read from the control track. Correspondingly, a marker unit as shown in FIG. 5 can be arranged to receive such signals read from the control track of the video medium of the video player 54 and/or from the control track of the digital tape medium of the digital tape player 70.

It will thus be seen that the invention described and illustrated above efficiently attains the objects set forth above, among those made apparent from the preceding description. Since certain changes may be made in carrying out the above method and in the constructions set forth without departing from the scope of the invention, it is intended that all matter contained in the above description or shown in the accompanying drawings be interpreted as illustrative and not in a limiting sense.

It is also to be understood that the following claims are intended to cover all generic and specific features of the invention herein described and all statements of the scope of the invention which, as a matter of language, might be said to fall therebetween.

Having described the invention, what is claimed as new and secured by Letters Patent is:

1. In the re-recording of recorded audio information, where said re-recording is in a set of one or more data tracks of a second storage medium having at least one mark track, and where the recorded audio information is read from a designated source location of a source recording on a first step storage medium, the improvement comprising the steps of A. producing a search marker in response to at least one of (i) the reading of information from said source recording and (ii) the reading of a source-location designation, and B. recording said search marker in said mark track, concurrently with the re-recording of the audio information in said set of data tracks, C. so that the audio information is re-recorded together with a search marker that was not recorded on the first storage medium.

2. In the re-recording of information according to claim 1, the further step of selecting said second medium to be a video medium or a digital audio medium.

3. In the re-recording of information according to claim 1, the further step of producing said search marker responsive to the identification of a location of said source recording.

4. In the re-recording of information according to claim 1, the further step of producing said search marker responsive to the commencement of reading information from a location of said source recording.

5. In the re-recording of information according to claim 1, the further step of producing said search marker responsive to the commencement of reading a selection of audio information from said source recording.

6. In the re-recording of information according to claim 1, the further step of producing said search marker responsive to a change in the location of said source recording from which audio information is read.

7. In the re-recording of information according to claim 1, the further improvement in which said producing and recording of a search marker include the steps of
   A. sensing a change in the source recording location from which audio information is read for said re-recording, and
   B. recording in the mark track of said second medium, concurrent with the re-recording of audio information read from said changed location, a new search marker in response to said sensed change in source-recording location.

8. In the re-recording of information according to claim 1, the further step of transmitting remote-control command signals to re-recording equipment for operating said equipment to record said search marker.

9. In the re-recording of information according to claim 1, the further step of transmitting remote-control infrared command signals to re-recording equipment for operating said equipment to record said search marker.

10. A method for operating a signal recorder for the storage, on a second medium, of audio information read from storage at a designated source location of a source recording on a first medium, said method comprising the steps of
    A. sensing a change in the source location from which audio information is being read,
    B. producing a search marker responsive to said sensed change in source location, and
    C. recording said search marker on said second medium in selected association with the re-recording of said audio information.

11. A method according to claim 10 in which said sensing of source location changes includes reading a designation of said source location and sensing a change in said designation of source location.

12. A method according to claim 10 in which said sensing of source location change includes monitoring power consumption for said reading of audio information and sensing a change in monitored power consumption corresponding to a selected change in source recording location.

13. A method according to claim 10 in which said sensing of source location change includes monitoring said audio information read from said source medium and sensing a parameter of said monitored information corresponding to a selected change in source location.

14. A method according to claim 10 including the further steps of
    A. storing a numerical search marker value,
    B. recording said search marker with a numerical value responsive to said stored numerical value, and
    C. selectively changing said stored search marker value in response to each sensing of a selected change in designated search location.

15. In the operation of remotely controllable recording equipment for the re-recording of recorded audio information, in a set of one or more data tracks of a second medium having at least one mark track, where the recorded audio information is read from storage in a designated source location of a source recording on a first medium, the improvement comprising the steps of
    A. producing remote-control command signals selected for operating said recording equipment to record a search marker in said mark track of said second medium, and
    B. transmitting said remote-control command signals to said recording equipment for recording said search marker in said mark track in selected association with the re-recording of the audio information in said set of data tracks,
    C. at least one of said steps of producing and transmitting being automatically responsive to at least one of (i) the reading of information from said source recording and (ii) the reading of a source-location designation,
    D. so that the audio information is re-recorded on the second storage medium together with a search marker that was not recorded on the first storage medium.

16. In the operation of remotely controllable recording equipment according to claim 15, the further step of selecting said remote-control command signals for the recording of a search marker having any one of an address search format and an index mark search format.

17. In the operation of remotely controllable recording equipment according to claim 15, the further steps of
    A. receiving signals for the remote-control recording operation of the recording equipment,
    B. storing format information of said received recording-operation signals, and
    C. producing said remote-control command signals with a format responsive to said stored format information,
    D. thereby to adapt, by programming, said remote-control command signals to the remote-control format of the recording equipment.

18. In apparatus for the re-recording of recorded audio information, in a set of one or more data tracks of a second storage medium having at least one mark track, where the recorded audio information is read from a designated source location of a source recording on a first storage medium, the improvement comprising
    A. means for producing a search marker in response to at least one (i) the reading of information from said source recording and (ii) the reading of a source-location designation, and
    B. means for recording said search marker in said mark track, concurrently with the re-recording of the audio information in said set of data tracks,
    C. so that the audio information is re-recorded together with a search marker that was not recorded on the first storage medium.

19. In apparatus according to claim 18, the further improvement
    A. in which said producing means includes means for sensing a change in the source recording location from which audio information is read for said re-recording, and B. in which said recording means includes means for recording in the mark track of said second medium, concurrent with the re-recording of audio information read from said changed location, a new search marker produced in response to said sensed change in source-recording location.

20. In apparatus according to claim 18, the further improvement including means for transmitting remote-control command signals to re-recording equipment for operating said equipment to record said search marker.

21. Apparatus for operating a signal recorded for the storage, on a second medium, of audio information read from storage at a designated source location of a source recording on a first medium, said apparatus comprising
  A. means for sensing a change in the source location from which audio information is being read,
  B. means for producing a marker signal in response to said sensed change in source location, and
  C. means for applying said marker signal to said signal recorder, thereby to record a search marker on said second medium in selected association with the re-recording of said audio information.

22. Apparatus according to claim 21 in which said change-sensing means includes means responsive to signals identifying at least one of (i) a change in the designation of source location from which information is read, (ii) a change in power consumption for said reading of audio information and corresponding to a selected change in source recording location, and (iii) a selected parameter of said audio information read from said source medium and corresponding to a selected change in source location.

23. In apparatus for operating remotely controllable recording equipment for the re-recording of recorded audio information, in a set of one or more data tracks of a second medium having at least one mark track, where the recorded audio information is read from storage in a designated source location of a source recording on a first medium, the improvement comprising
  A. means for producing remote-control command signals selected for operating the recording equipment to record a search marker in said mark track of said second medium,
  B. means for transmitting said remote-control command signals to the recording equipment for re-cording of said search marker in said mark tracks in selected association with the re-recording of the audio information in said set data tracks, and
  C. means for effecting said recording of said search marker automatically in response to at least one of (i) the reading of information from said source recording and (ii) the reading of a source-location designation.

24. In apparatus according to claim 23, the further improvement comprising
  A. means for receiving signals for the remote-control marking operation of the recording equipment,
  B. means for storing format information of said received marking-operation signals, and
  C. means for producing said remote-control command signals with a format responsive to said stored format information.

* * * * *